US010606869B2

(12) United States Patent
Poteet et al.

(10) Patent No.: US 10,606,869 B2
(45) Date of Patent: *Mar. 31, 2020

(54) EVENT MATCHING BY ANALYSIS OF TEXT CHARACTERISTICS (E-MATCH)

(71) Applicant: The Boeing Company, Chicago, IL (US)

(72) Inventors: Stephen R. Poteet, Bellevue, WA (US); Nigel Isaac Anthony Kilmer, Woodinville, WA (US); David Charles Augustine, Seattle, WA (US); Anne Shu-Wan Kao, Bellevue, WA (US); Shan Luh, Kenmore, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/167,499

(22) Filed: Oct. 22, 2018

(65) Prior Publication Data

US 2019/0057098 A1    Feb. 21, 2019

Related U.S. Application Data

(63) Continuation of application No. 13/920,057, filed on Jun. 17, 2013, now Pat. No. 10,108,697.

(51) Int. Cl.
*G06F 16/30* (2019.01)
*G06F 16/38* (2019.01)

(52) U.S. Cl.
CPC .............. *G06F 16/30* (2019.01); *G06F 16/38* (2019.01)

(58) Field of Classification Search
CPC ......... G06F 17/30648; G06F 17/30864; G06F 17/30867
See application file for complete search history.

(56) References Cited

U.S. PATENT DOCUMENTS

| 3,480,806 A | 11/1969 | Berberich |
| 4,134,034 A | 1/1979 | Dardai et al. |
| 7,236,923 B1 * | 6/2007 | Gupta .................. G06F 17/277 704/7 |

(Continued)

OTHER PUBLICATIONS

"Becker", "Learning Similarity Metrics for Event Identification in Social Media", WSDM' 10, Feb. 4-6, 2010, 10 pages.*

(Continued)

*Primary Examiner* — Loc Tran
(74) *Attorney, Agent, or Firm* — McDonnell Boehnen Hulbert & Berghoff LLP

(57) ABSTRACT

A system and method for event matching by analysis of text characteristics are presented. A document collection comprising documents is acquired. One or more document subsets of the document collection each comprising one or more documents potentially describing identical events are identified based on certain structured metadata fields of the documents. Salient text features are extracted from the documents in the document collection. An event similarity score for pairs of documents in the document collection is generated by comparing the text features extracted from the documents. A common event document list comprising sets of documents in the document collection whose event similarity scores with each other are above a similarity threshold is generated.

21 Claims, 3 Drawing Sheets

(56) References Cited

U.S. PATENT DOCUMENTS

| | | | |
|---|---|---|---|
| 7,403,932 B2 | 7/2008 | Kao et al. | |
| 7,963,115 B1 | 6/2011 | Sondergaard et al. | |
| 8,180,504 B1* | 5/2012 | Nance | B64C 25/00 |
| | | | 701/16 |
| 2002/0103799 A1 | 8/2002 | Bradford et al. | |
| 2007/0106499 A1 | 5/2007 | Dahlgren et al. | |
| 2007/0118506 A1 | 5/2007 | Kao et al. | |
| 2008/0109454 A1* | 5/2008 | Willse | G06F 16/313 |
| 2008/0141117 A1 | 6/2008 | King et al. | |
| 2009/0281906 A1 | 11/2009 | Cai et al. | |
| 2010/0005386 A1 | 1/2010 | Verma et al. | |
| 2010/0100817 A1 | 4/2010 | Trotter | |
| 2011/0047168 A1 | 2/2011 | Ellingsworth | |
| 2012/0185478 A1 | 7/2012 | Topham et al. | |
| 2012/0221324 A1* | 8/2012 | Machii | G06F 16/3344 |
| | | | 704/9 |
| 2012/0323738 A1 | 12/2012 | Gokturk et al. | |
| 2013/0006611 A1* | 1/2013 | Brdiczka | G06F 17/2705 |
| | | | 704/9 |
| 2014/0089020 A1 | 3/2014 | Murphy | |

OTHER PUBLICATIONS ("Kunnaran", "Text Classification and Named Entities for New Event Detection", SIGIR' 04, Jul. 25-29, 2004, 8 pages.*
Becker et al, "Learning Similarity Metrics for Event Identification in Social Media", WSDM'10, Feb. 4-6, 2010, 10 pages.*
Becker et al., Learning Similarity Metrics for Event Identification in Social Media, Feb. 4-6, Copyright 2010 ACM, 10 pages.
Kumaran et al., Text Classification and Named Entities for New Event Detection , SIGIR' 04, Jul. 25-29, 2004, 8 pages.

* cited by examiner

EVENT MATCHING BY ANALYSIS OF TEXT CHARACTERISTICS (E-MATCH)

FIELD

Embodiments of the present disclosure relate generally to documents contents assessment systems, and more particularly relate to electronic event matching by analysis of unstructured text features is a document.

BACKGROUND

It is difficult and time consuming for a reader to read through similar texts and manually identify different texts that refer to the same event.

SUMMARY

A system and method for event matching by analysis of text characteristics is presented. A document collection comprising documents is acquired. To improve speed, document subsets of the document collection comprising documents potentially describing identical events may be identified based on structured metadata fields of the documents. Salient text features are extracted from the documents in the document collection. Certain text features may be normalized by converting them to a standard form so that they are comparable. An event similarity score for subsets of documents in the document collection is generated by comparing the text features extracted from the documents. A common event document list is generated comprising sets of documents whose event similarity scores with each other are above a similarity threshold.

In this manner, embodiments examine a collection of documents which are on similar topics, and automatically identify important similarities between documents in the collection.

In a first embodiment, a method for event matching by analysis of text characteristics acquires a document collection comprising a plurality of documents. The method then identifies one or more document subsets of the document collection, each comprising one or more documents potentially describing identical events based on certain structured metadata fields of the documents. The method further extracts salient text features from the documents in the document collection. The method then generates an event similarity score for pairs of documents in the document collection by comparing the salient text features extracted from the documents. The method further generates a common event document list comprising sets of documents in the document collection whose event similarity scores with each other are above a similarity threshold.

In a second embodiment, a system for event matching by analysis of text characteristics comprises, a web crawler module, a text feature extraction module, an initial document grouping module, a similarity scoring module, and a similar document list module. The web crawler module is configured to acquire a document collection comprising a plurality of documents. The initial document grouping module is configured to identify one or more document subsets of the document collection, each comprising one or more documents that potentially describe the same event based on structured metadata fields of the documents. The text feature extraction module is configured to extract salient text features from each document in the document collection. The similarity scoring module is configured to generate an event similarity score for pairs of documents in the document collection by comparing the text features extracted from the documents. The similar document list module is configured to generate a common event document list comprising sets of documents in the document collection whose event similarity scores with each other are above a similarity threshold.

In a third embodiment, a non-transitory computer readable storage medium comprises computer-executable instructions for event matching by analysis of text characteristics. The computer-executable instructions acquire a document collection comprising a plurality of documents. The computer-executable instructions further identify one or more document subsets of the document collection, each comprising one or more documents potentially describing identical events based on certain structured metadata fields of the documents. The computer-executable instructions further extract salient text features from the documents in the document collection. The computer-executable instructions further generate an event similarity score for pairs of documents in the document collection by comparing the text features extracted from the documents. The computer-executable instructions further generate a common event document list comprising sets of documents in the document collection whose event similarity scores with each other are above a similarity threshold.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Embodiments of the present disclosure are hereinafter described in conjunction with the following figures, wherein like numerals denote like elements. The figures are provided for illustration and depict exemplary embodiments of the present disclosure. The figures are provided to facilitate understanding of the present disclosure without limiting the breadth, scope, scale, or applicability of the present disclosure. The drawings are not necessarily made to scale.

DETAILED DESCRIPTION

The following description is presented to enable a person of ordinary skill in the art to make and use the embodiments of the disclosure. The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding technical field, background, brief summary or the following detailed description. The present disclosure should be accorded scope consistent with the claims, and not limited to the examples described and shown herein.

Embodiments of the disclosure are described herein in the context of one practical non-limiting application, namely, event matching based on multi-word terms (phrases) and numbers and alphanumeric strings. Embodiments of the disclosure, however, are not limited to the text features described herein, and the embodiments may also be utilized in other applications. For example, embodiments may be applicable to graphical characters such as language characters, and the like.

As would be apparent to one of ordinary skill in the art after reading this description, these are merely examples and the embodiments of the disclosure are not limited to operating in accordance with these examples. Other embodiments may be utilized and structural changes may be made without departing from the scope of the exemplary embodiments of the present disclosure.

A method according to the embodiments examines a collection of documents which describe similar events, and automatically identifies which documents most likely describe the same event. The documents/data general come from multiple data sources, written with diverse terminology. The method automatically extracts and stores salient text at attributes/features in each document, and may normalize identified features as appropriate. Not all features can be normalized, e.g., arbitrary alphanumeric identifiers and multi-word terms may not be amenable to normalization, unless one starts with a list of possible values for these. The method then compares the documents and scores their similarity based on these features. The results can be examined by a subject matter expert for disposition, or automatically resolved by a software tool realized in a non-transitory computer media and stored, for example, in a database.

Figure 2:
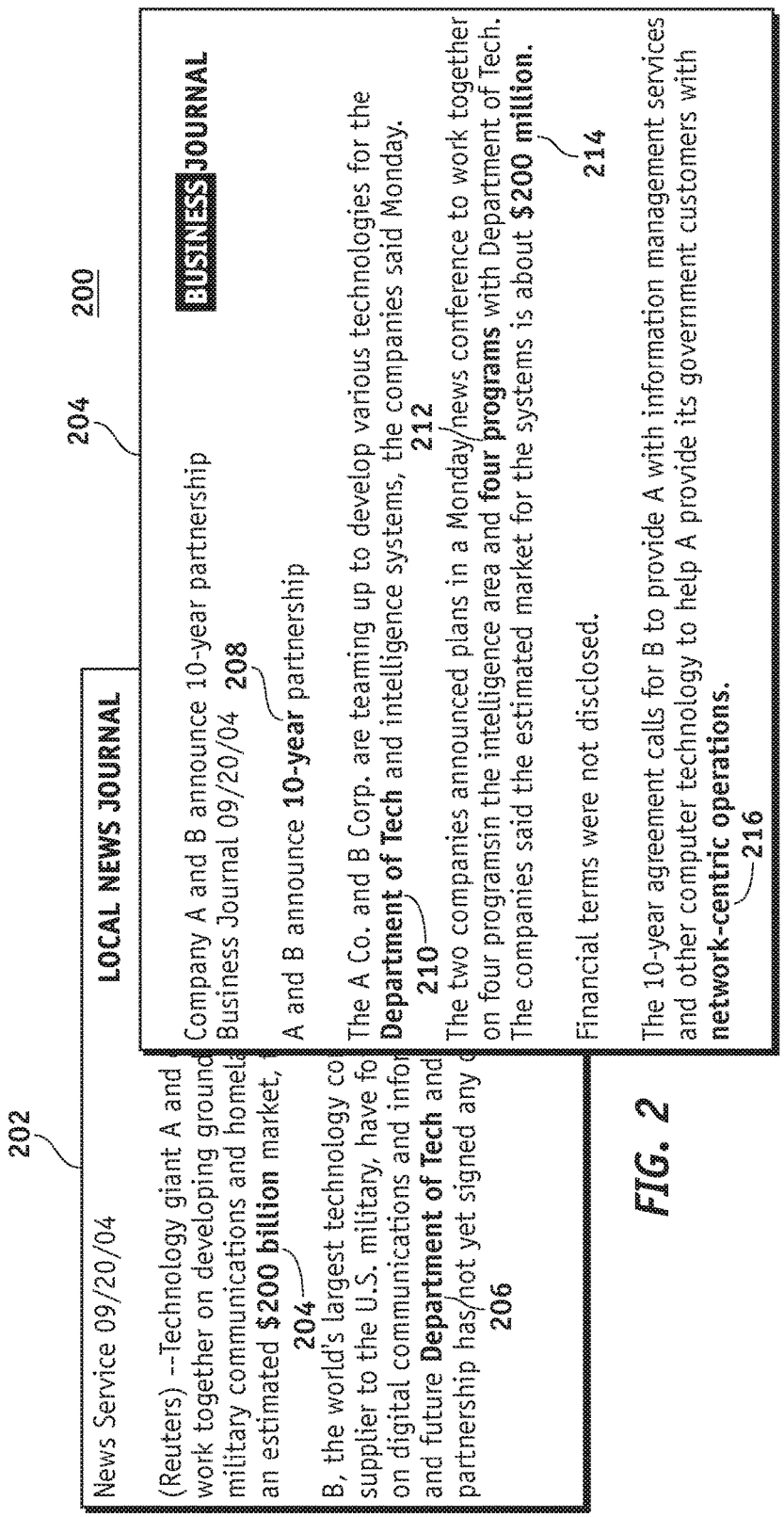
FIG. 2 is an illustration of documents shoving actual differences in details in different reports of the same news story.

Data from multiple sources may comprise different reports describing or referring to the same event. In other examples, reports describing the same event may comprise important differences that a user would wish to identify. For example, a search engine news may provide multiple entries for a same news event from different sources as shown in FIG. 2. It is hard for users to read through these different sources manually and identify significant differences. For example, a team that studies aviation safety is interested in counting the occurrences of a certain type of event, but different sources may contain duplicate reports of the same event. Sometimes even the same source may contain duplicate reports of the same event. For example, different versions of the same story from the same new agency or an anonymous, self-reporting aviation event system that may have different reports of the same event from different people. Manually sorting out duplicates can be very time consuming, and with diversity in terminology use and in writing style, it is very challenging for a non-automated tool to accomplish these tasks.

Existing methods generally are not concerned with a specific event, but rather are concerned with identifying subtle differences in stories already known or assumed to be related, Existing methods generally require an ontology of entity types and an entity extractor to find the differences and to allow a user to fine-tune what types of differences they are interested in (e.g., what types of entities such as an organization, money amounts, etc.).

In contrast embodiments identify which stories are about the same event. Further in contrast to the existing solutions, embodiments utilize one or more of the following features: (1) multi-word terms or phrases; (2) numbers and alphanumeric patterns; (3) single-word terms that satisfy some measure of rarity or uniqueness like inverse document frequency (IDF).

Figure 1:
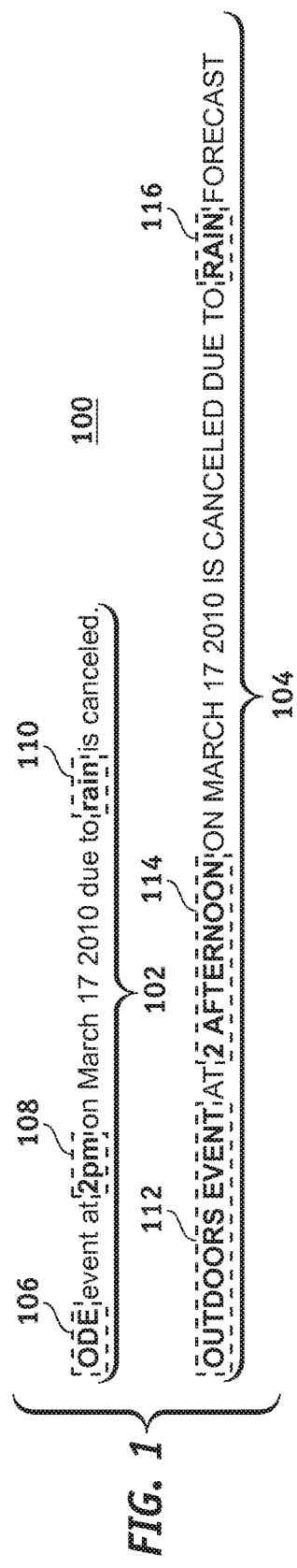
FIG. 1 is an illustration of two reports of the same event indicating how a human reader may identify some text features that help her/him determine the two reports are about the same event, despite a different expression of those features.

FIG. 1 is an illustration of two reports 102 and 104 of the same event indicating how a human reader may identify some text features that help her/him determine the two reports are about the same event, despite a different expression of those features. For example, a human reader may identify, "ODE" 106 with "OUTDOORS EVENT" 112, "2pm" 108 with "2 AFTERNOON" 114, and "rain" 110 with "RAIN" 116.

FIG. 2 is an illustration of documents showing actual differences in details in different reports of the same news story. News story 202 is the same as news story 204 but comprises in part the following differences:

"$200 billion" 204 in the news story 202 vs. "$200 million" 214 in the news story 204.

"10-year" 208 in the news story 204 is not shown in the news story 202.

The news story 202 does not contain "four programs" 212 shown in the news story 204.

Department of tech 206 in the news story 202 is shown in different context than department of tech 210 in the news story 204.

Network-centric operations 216 in the news story 204 is not shown in the news story 202.

It may be difficult for a reader to quickly read through a large number of similar texts such as the news story 202 and the news story 204 and manually identify 1) which stories are really about the same event; and 2) for those texts that are about the same event, what details are the same and what details are different.

Figure 3:
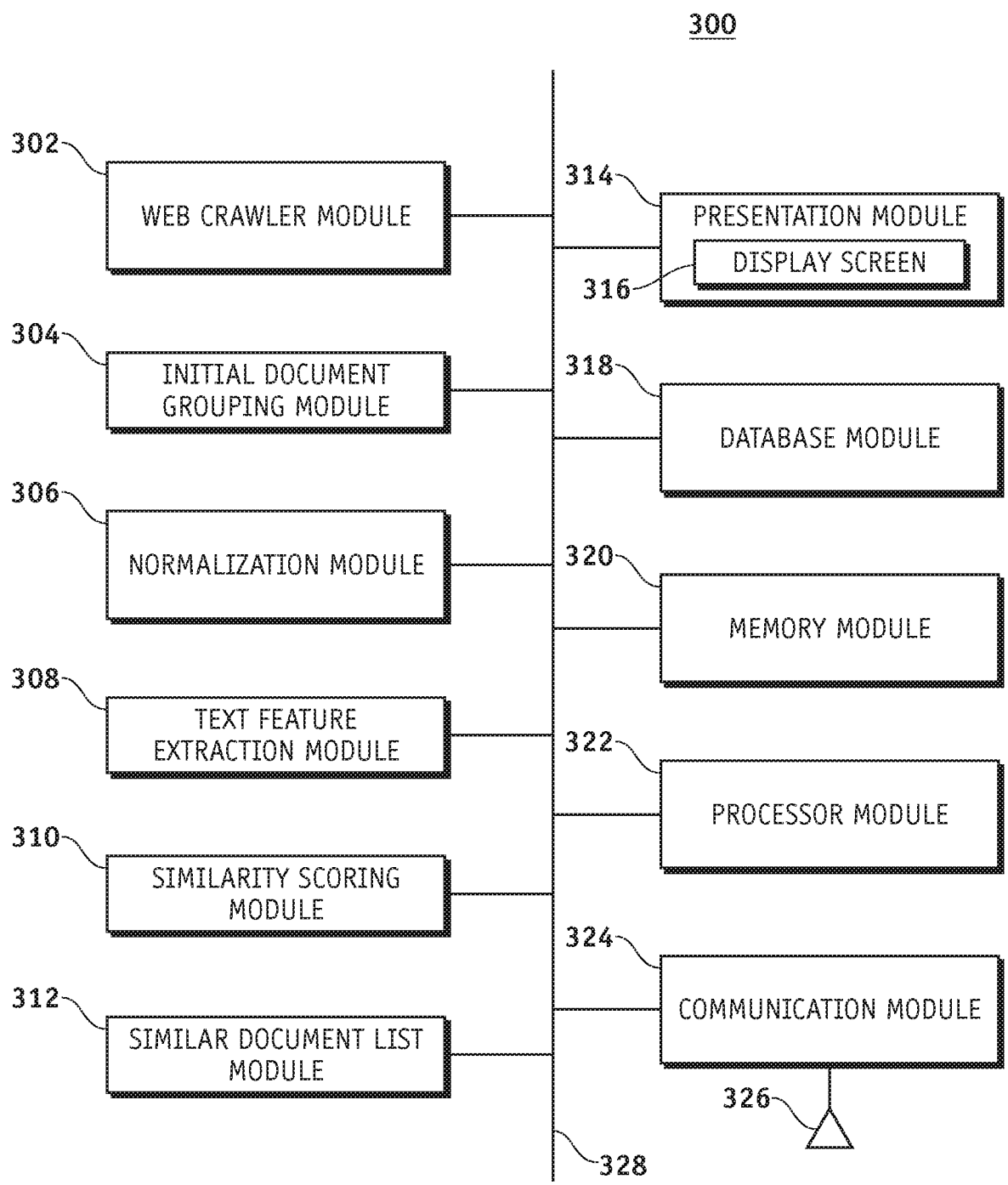
FIG. 3 is an illustration of exemplary functional block diagram of an event matching by analysis of text characteristics system according to an embodiment of the disclosure.

FIG. 3 is an illustration of exemplary functional block diagram of an event matching by analysis of text characteristics system (E-MATCH system 300) according to an embodiment of the disclosure. The E-MATCH system 300 may comprise: a web crawler module 302, an initial document grouping module 304, a normalization module 306, a text feature extraction module 308, a similarity scoring module 310, a similar document list module 312, a presentation module 314, a database module 318, a memory module 320, a processor module 322, and a communication module 324.

A collection of documents or reports (which may be determined in a number of ways, comprising a set of sources or a keyword or metadata search) is first grouped into subsets using metadata. Then salient text features, such as phrases and numerical expressions, are extracted from a free text and may be normalized. Reports are then compared based on these features, where the comparison score may be just a raw number of matches or some more complicated combination of feature comparison scores such as a Jaccard similarity coefficient (Jaccard measure of similarity) or a cosine similarity (cosine measure of similarity) possibly involving differential weighting of features, using various methods, such as inverse document frequency (IDF). The Jaccard similarity coefficient, the cosine similarity, and the IDF may be used by any method known in the art.

Reports that have been determined to be most likely about the same event based on their match scores being above a certain threshold are either stored in the memory module 320 for later use or displayed to the users, listing or highlighting matching and mismatching features, for their analysis. Display of the features can help the users quickly determine whether a match is correct or not, what features are different in the two reports even when they are about the same event, and even allow them to recognize features as matching when the system did not (i.e., add to a synonym or acronym list).

Metadata is a term of the art that may refer to "data about data". For example, metadata may comprise well structured content fields comprising information that may be used to narrow down sets of records or documents that might refer to a same event. For example, metadata may comprise, without limitation, time, location, or other salient entities or entity types (e.g., airplane models) that can speed up the process of comparison (e.g., using database functionality on values that don't need any normalization). Furthermore, metadata may comprise, without limitation, structural metadata, descriptive metadata, or other type of metadata.

Structural metadata may refer to design and specification of data structures such as data about containers of data. Descriptive metadata may refer to individual instances of application data such as data content, "data about data content", "content about content" and metacontent. Metadata may be used to describe data using standards specific to a particular discipline. If a document is not grouped with other documents based on metadata fields, it may not be necessary to extract text features, which potentially could save time.

The web crawler module 302 is configured to acquire a document collection comprising a plurality of documents. The web crawler module 302 may gather the document collection from an electronic resource using for example but without limitation, a set of sources, a keyword, a metadata search, or other criteria. Two or more of the documents with similar topics are then examined to identify their important differences and how likely they are about the same event or type of event as explained below. The electronic resource may comprise, for example but without limitation, free text fields in a local or remote database, a locally stored electronic document, a remotely accessible electronic document, an interactive on-line Internet cloud-computing document service, a local or remote document management system, or other electronic resource.

The initial document grouping module 304 is configured to identify one or more document subsets of the document collection, each subset comprising documents that describe potentially identical events based on structured metadata fields of the salient text features from each document in the document collection, for example all the documents with the same time. The structured metadata fields may comprise, for example but without limitation, time, location, airplane model, entities or entity types characteristic of the everts in question, or other relevant event attributes.

These metadata features, however, even if available, are often not enough to reliably identify two reports as referring to the same event. In order to do that, additional features from the free text are needed. Two general categories of such features are phrases or multi-word terms, especially phrases describing "things" in a broadest sense (e.g., including organizations and processes, as well as objects like parts and equipment), and numerical expressions. Unlike single words, these tend to be fairly uniquely associated with events, especially when two or more words are shared by two or more reports. They also have the advantage of not requiring an extensive knowledge base in order to identify them, and are thus domain independent.

The text feature extraction module 308 is configured to extract salient text features (if present) from documents in the document collection. In order to assist users, what is needed is to find features that are characteristic of a particular event and are relatively easy for a computer to find. The salient text features may comprise for example but without limitation, phrases or multi-word terms, numbers, alphanumerical expressions, or other features, since these features tend to be characteristic of a particular event and are relatively easy for a computer to find.

Some documents may not contain any relevant text features, which means such documents would not be able to be compared with other documents. Also, as noted above, text features may not need to be extracted from all the documents, if they have already been excluded from combination with other documents based on metadata.

These text features may be stored in the database module 318 and be available at run-time of the E-MATCH system 300 for further analysis when needed. New data may be processed as it arrives or in a batch. The multi-word terms may comprise, for example but without limitation, "takeoff roll", "took corrective action", "landing gear", or other multi-word term. The alphanumeric strings may comprise pure numbers, numbers with units, or alphanumeric identifiers, such as, for example but without limitation, "1,324", "150 knt", "200 nm", "100deg", "nos. 1,2,3", "#1", "cfm56-3-b1", "b-737", or other number. Other, automatically extracted multi-word terms may comprise, for example but without limitation, "apu and wheel well warnings", "crew heard a pop and a seat moved", "weather warning presented", or other multi-word term.

There are various ways of extracting multi-word terms automatically. One method is by identifying N-grams, sequences of words that occur more frequently than is likely given the occurrence of the individual words in the sequence. These can be of various lengths ("N"), typically 2-5 words. Other methods may also be used.

Numerical expressions can come in a variety of flavors. Several types of the numerical expressions are especially useful in describing events: pure number, number plus unit, alphanumeric expressions (e.g., as IDs for documents, equipment, organizations, etc.), and expressions of the form "No. 1 " and its variants. Typically, regular expressions are used to extract these features.

A regular expression is a term of art that may refer to a formal language description often called a pattern. A regular expression may comprise an expression that specifies a set of strings, and rules are used to specify members of the set of strings. Additional description of regular expressions can be found in the Internet, or a formal language, formal grammars, and/or computational linguistics text book.

Whether phrases or numerical expressions, these features often have minor variations that have to be taken into account when comparing them. With phrases, they can differ in one or two words, especially non-content words like "of" or "the" while still referring to the same thing (e.g., "snow sticks to the aircraft" vs. "snow on the aircraft"), or they can involve misspellings or alternate spellings of the same word (e.g., "airplane returned to blocks" vs. "airplane returned to blocs"). Some of this can be handled automatically with various fuzzy matching algorithms. Others can be handled with synonym or acronym lists (e.g., "rejected takeoff" vs. "RTO").

Terms can be either exactly matched or "fuzzily" matched between records such as, for example but without limitation, "aircraft came to a halt" can be matched to "aircraft came to a stop", "airplane returned to blocks" can be matched to "airplane returned to blocs", "snow sticks to the aircraft" can be matched "snow on the aircraft", or other match.

Numerical expressions can comprise variations such as a pure number differing by a small amount (e.g., "11" vs. "12") or one source rounding a number and another not. Number plus units can vary in a number of ways (e.g., "150 KNOTS" vs. "150kts"), with the unit abbreviated (in various ways) or not or with a space separating the number and the unit. Alphanumeric expressions often have "0" (zero) and capital "O" or "1" one) and lower case "L" or upper case "I" reversed or may involve other typos. These can all be solved fairly automatically with limited or no knowledge bases (synonyms and acronyms being an exception), using numerical distance or regular expressions to normalize these, or a fuzzy match algorithm to match alphanumeric expressions with non-systematic typos.

The normalization module 306 is operable to convert different variations of certain types of text feature into a standard form typically using regular expressions. In this manner, the normalization module 306 is configured to normalize certain text features by converting them to a standard form so that they are comparable. In some embodiments the normalization module 306 may be combined with the text feature extraction module 308. In this case normalization and text feature extraction may be performed concurrently. In some configurations normalization may be performed before text feature extraction. For example, acronym expansion and synonym replacement may precede extraction of multiword terms/phrases.

General non-normalized alphanumeric patterns may comprise, for example but without limitation, "26R", "FL240", "34-12-01", or other alphanumeric pattern.

Examples of normalized number and unit patterns may comprise, without limitation, the following:

"110kts", "110kt", "110 knts", "110 knots" all into "110_knots";

"700 k", "700 kilos", "700kgs" all into "700_kilograms";

"26 volt", "26v" both into "26_volts"; and

"180 degree", "180deg" both into "180_degrees".

Examples of normalized number X (Y, Z)+alphabet patterns may comprise, without limitation, the following:

"#1", "nr 1", "no. 1" all into "#1";

"nbr 1 and 2", "nr 1 and 2", "nr 1 & 2" all into "#1 and #2";

"nbr 1, 2, 5 and 6" all into "#1, #2, #5, and #6"; and

"nos. 3 through 6" into "#3, #4, #5, and #6".

Capturing longer alphanumeric patterns like number plus unit instead of only pure numbers typically improves precision (out of all of the items the system identified, how many are correct), by distinguishing "100 kts" and "100 kgs". Normalized number-unit tokens: "100_kts" and "100_kgs" correctly, do not match. Alphanumeric tokens for these as pure numbers would be "100" and "100", i.e., they would mistakenly match.

The following are examples of how the normalization module 306 improve recall (out of all correct answers, how many did the system identify):

Example 1: "100 knots", "100kts" and "100knts" will be normalized as "100_kts". Without the normalization module 306 alphanumeric tokens for these would be "100" (or "100 knots"), "100kts" and "100knts", respectively, and would not match.

Example 2: "Num 1", "nbr. 1" and "#1" be normalized as "#1". Without normalization module 306, alphanumeric tokens for these would be "1", "1", and "#1", respectively, and only first two would match.

The similarity scoring module 310 is operable to generate an event similarity score for pairs of documents in the document collection by comparing the text features extracted from the documents. For example, the event similarity score for two documents may be the number of features that match or it may be a more complicated combination of feature comparison scores possibly involving differential weighting of features, and comparison using various methods. For example, an event similarity score may include weighting of the salient text features for each pair of the pairs of documents based on a rarity measure. The salient text features may include single word terms that satisfy the rarity measure. In some embodiments, the rarity measure may comprise an inverse document frequency (IDF).

The similar document list module 312 is operable to generate a common event document list comprising sets of documents in the document collection whose event similarity scores with each other are above a similarity threshold. The similarity threshold, may comprise for example but without limitation, sharing at least two text features in common or having a weighted comparison score above some figure depending on the scoring method used. The threshold can be set by the user based on their application and data or can be adjusted based on feedback from the user (e.g., their confirmation or disconfirmation of certain suggested groupings of documents.

The presentation module 314 is operable to present the common event document list, matching text features, non-matching text features, or a combination thereof to a user. The common event document list may comprise likely duplicated documents identified, a similarity score, important similar features and differences. System 300 can incorporate user feedback, and use machine learning to improve future results.

The presentation module 314 may comprise a display screen 316. The display screen 316 may use a technology, such as, but without limitation, a liquid crystal display (LCD), an organic electro-luminescence (OEL), an organic light emitting diode (OLED), an organic electro luminescent device (OELD), an electronic ink, and the like. Various kinds of information can be displayed on the display screen 316 via an image/video signal supplied from a processor module 322. The presentation module 314 may also comprise user input means (not shown) to receive user input (a key pad, a touchpad, a voice input, etc.). The user input/feedback may be processed at the processor module 322 to improve the future results.

The database module 318 may be configured to store, maintain, and provide data as needed to support the functionality of the E-MATCH system 300 in the manner described below. For example, the database module 318 is configured to store the common event document list in a non-transitory storage medium. The database module 318 may comprise a lookup table for purposes of storing the data. Moreover, the database module 318 may be, for example but without limitation, a local database locally coupled to the processor module 322, a remote database such as a central network database remotely coupled to processor module, other storage source, or a combination thereof. The database module 318 may be comprised in the memory module 320.

The memory module 320, may be realized as a non-volatile storage device (non-volatile semiconductor memory, hard disk device, optical disk device, and the like), a random access storage device (for example, SRAM, DRAM), or any other form of storage medium known in the art. The memory module 320 may be coupled to the processor module 322 that can read information from, and write information to the memory module 320. The memory module 320 may store, for example but without limitation, the common event document list, the matching text features, the non-matching text features, the user feedback, a synonym list, an acronym list, salient text features, and/or other parameters.

The processor module 322 can control overall operation of the E-MATCH system 300. For example, the processor module 322 may control operations of the E-MATCH system 300 so that processes of the E-MATCH system 300 are suitably performed. Processes of the E-MATCH system 300 may be suitably performed such that various processes are performed by proper procedures in response to an input from a user or automatically.

These processes may comprise, for example but without limitation, directing the web crawler module 302 to acquire the document collection, directing the text feature extraction module 308 to extract the salient text features, directing the initial document grouping module 304 to identify one or more document subsets of the document collection, directing the normalization module 306 to generate one or more normalized text feature subsets, and other functions as explained above. The processor module 322 may also control a communication of the communication module 324. For another example, the processor module 322 may control the display screen 316 to display the common event document list.

The processor module 322, may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or other software or hardware machines.

A processor may also be implemented as a combination of computing devices, e.g., a combination of a digital signal processor and a microprocessor, a plurality of microprocessors, one or more microprocessors in conjunction with a digital signal processor core, or any other such configuration. The processor module 322 comprises processing logic that is configured to carry out the functions, techniques, and processing tasks associated with the operation of the E-MATCH system 300.

In particular, the processing logic is configured to support the method of the E-MATCH system 300 described herein. Furthermore, the steps of a method or algorithm described in connection with the embodiments disclosed herein may be embodied directly in hardware, in firmware, in a software module executed by the processor module 322 or in any combination thereof.

As an example, the processor module 322 and memory module 320 may reside in their respective ASICs. The memory module 320 may also be integrated into the processor module 322. In an embodiment, the memory module 320 may include a cache memory for storing temporary variables or other intermediate information during execution of instructions to be executed by the processor module 322. The memory module 320 may also include non-volatile memory for storing instructions to be executed by the processor module 322.

The communication module 324 is operable to transmit and receive a plurality of communication signals comprising data signals via a transceiver (not shown) under control of the processor module 322. The communication module 324 operates with an antenna 326 to carry out a radio communication with a network side device via a base station communicatively coupled to a wireless communication network (not shown).

The communication module 324 can transmit a signal from the processor module 322 as a transmitted radio signal to a base station through the antenna 326, and can demodulate a received radio signal received from the base station through the antenna 326. The processor module 322 receives a demodulated signal form the communication module 324.

The communication module 324 may also comprise an Ethernet/USB communication module (not shown) configured to provide communication between the E-MATCH system 300 and the electronic resources via Ethernet. The Ethernet/USB communication module communicates with the Internet through an access port to download documents, and to interact with Web-based services.

The various illustrative blocks, modules, processing logic, and circuits described in connection with the E-MATCH system 300 may be implemented or performed with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein.

The illustrated E-MATCH system 300 depicts a simple embodiment for ease of description. These and other elements of the E-MATCH system 300 are interconnected together, allowing communication between the various elements of the E-MATCH system 300. In one embodiment, these and other elements of the E-MATCH system 300 may be interconnected together via a data communication bus 328.

Figure 4:
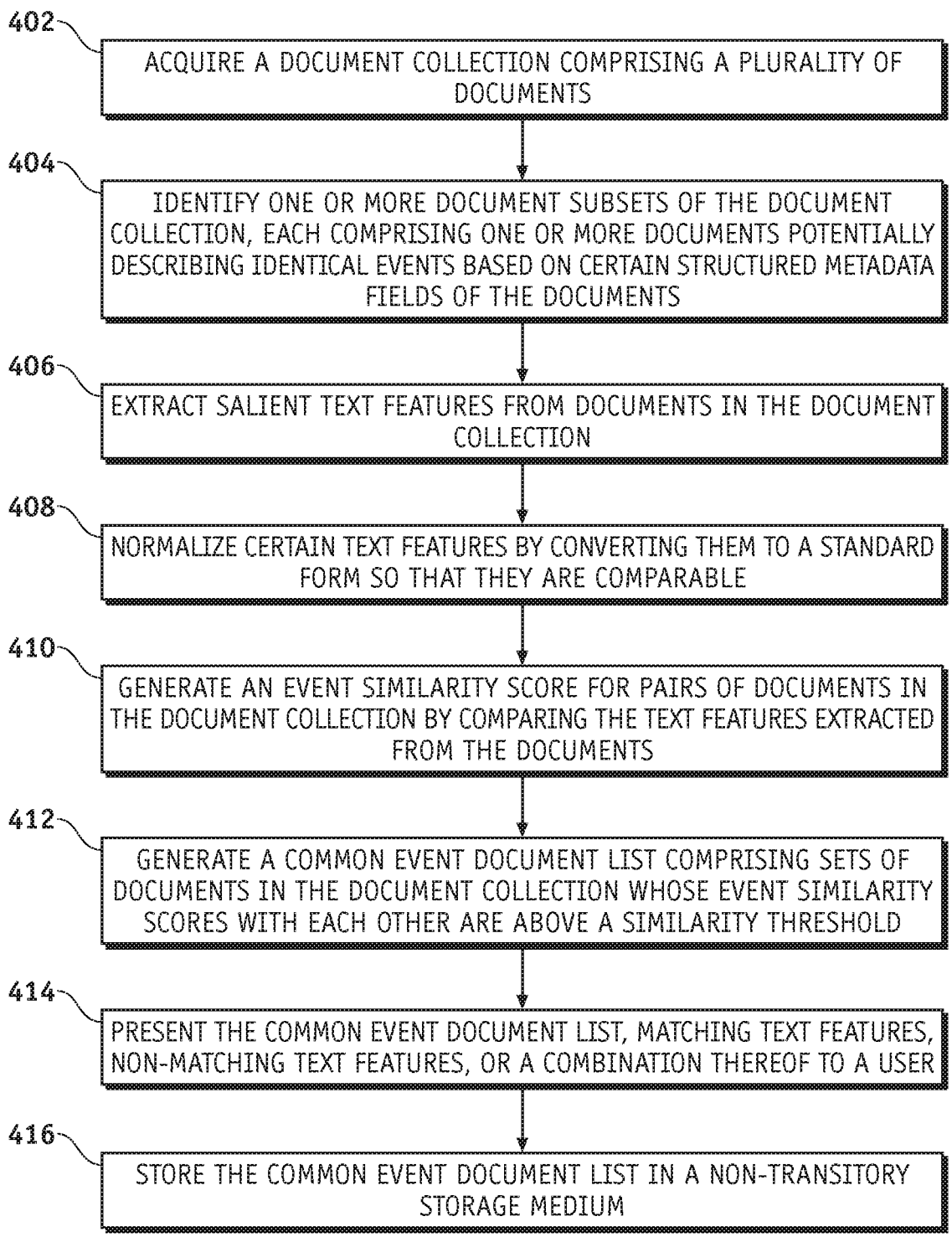
FIG. 4 is an illustration of a flowchart showing an exemplary process for event matching by analysis of text characteristics according to an embodiment of the disclosure.

FIG. 4 is an illustration of a flowchart showing an exemplary process 400 for event matching by analysis of text characteristics according to an embodiment of the disclosure. The various tasks performed in connection with process 400 may be performed by software, hardware, firmware, a computer-readable medium having computer executable instructions for performing the process method, or any combination thereof. The process 400 may be recorded in a computer-readable medium such as a semiconductor memory, a magnetic disk, an optical disk, and the like, and can be accessed and executed, for example, by a computer CPU in which the computer-readable medium is stored.

It should be appreciated that process 400 may include any number of additional or alternative tasks, the tasks shown in FIG. 4 need not be performed in the illustrated order, and process 400 may be incorporated into a more comprehensive procedure or process having additional functionality not described in detail herein. For illustrative purposes, the following description of process 400 may refer to elements mentioned above in connection with FIG. 2.

In some embodiments, portions of process 400 may be performed by different elements of the E-MATCH system 300 for event matching by analysis of text characteristics such as: the web crawler module 302, the initial documents grouping module 304, the text feature extraction module 308, the normalization module 306, a similarity scoring module 310, the similar document list module 312, the presentation module 314, the database module 318, the memory module 320, the processor module 322, the communication module 324, etc. Process 400 may have functions, material, and structures that are similar to the embodiments shown in FIG. 2. Therefore common features, functions, and elements may not be redundantly described here.

Process 400 may begin by the web crawler module 302 acquiring a document collection comprising a plurality of documents (task 402).

Process 400 may, as an optional step, continue by the initial document grouping module 304 identifying one or more document subsets of the document collection, each comprising one or more documents potentially describing identical events based on certain structured metadata fields of the documents (task 404).

Process 400 may continue by the text feature extraction module 308 extracting salient text features from documents in the document collection (task 406).

Process 400 may, as an optional step, continue by the normalization module 306 normalizing certain text features by converting them to a standard form so that they are comparable (task 408).

Process 400 may continue by the similarity scoring module 310 generating an event similarity score for pairs of documents in the document collection by comparing the text features extracted from the documents (task 410).

Process 400 may continue by the similar document list module 312 generating a common event document list comprising sets of documents in the document collection whose event similarity scores with each other are above a similarity threshold (task 412).

Process 400 may continue by the presentation module 314 presenting the common event document list, matching text features, non-matching text features, or a combination thereof to a user (task 414).

Process 400 may continue by the memory module 320 storing the common event document list in a non-transitory storage medium (task 416).

In this way, a system and a method are provided for event matching by analysis of text characteristics in electronic documents.

In this document, the terms "computer program product", "computer-readable medium", and the like may be used generally to refer to media such as, for example, memory, storage devices, or storage unit. These and other forms of computer-readable media may be involved in storing one or more instructions for use by the processor module 322 to cause the processor module 322 to perform specified operations. Such instructions, generally referred to as "computer program code" or "program code" (e.g., which may be grouped in the form of computer programs or other groupings), when executed, enable the language mapping method of the E-MATCH system 300.

While at least one exemplary embodiment has been presented in the foregoing detailed description, the disclosure is not limited to the above-described embodiment or embodiments. Variations may be apparent to those skilled in the art. In carrying out the disclosure, various modifications, combinations, sub-combinations and alterations may occur in regard to the elements of the above-described embodiment insofar as they are within the technical scope of the disclosure or the equivalents thereof. The exemplary embodiment or exemplary embodiments are examples, and are not intended to limit the scope, applicability, or configuration of the disclosure in any way. Rather, the foregoing detailed description will provide those skilled in the art with a template for implementing the exemplary embodiment or exemplary embodiments.

It should be understood that various changes can be made in the function and arrangement of elements without departing from the scope of the disclosure as set forth in the appended claims and the legal equivalents thereof. Furthermore, although embodiments of the disclosure have been described with reference to the accompanying drawings, it is to be noted that changes and modifications may be apparent to those skilled in the art. Such changes and modifications are to be understood as being comprised within the scope of the disclosure as defined by the claims.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIG. 3 depicts example arrangements of elements, additional intervening elements, devices, features, or components may be present in an embodiment of the disclosure.

Terms and phrases used in this document, and variations hereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items in the grouping be present, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

The invention claimed is:

1. A computer-implemented method for event matching, the computer-implemented method comprising: acquiring a plurality of documents, wherein each document of the plurality of documents comprises respective metadata that is indicative of an event attribute; identifying a document subset comprising multiple documents of the plurality of documents using the respective metadata for each document of the multiple documents; extracting a first salient text feature from a first document of the multiple documents and a second salient text feature from a second document of the multiple documents; determining, based on a comparison between the first salient text feature and the second salient text feature, an event similarity score for the first document and the second document; and upon determining that the event similarity score satisfies a threshold condition, including the first document and the second document as a pair of documents in a common event document list, wherein the common event document list identifies pairs of documents whose respective event similarity scores satisfy the threshold condition; providing, for display by a presentation module, a representation of the pair of documents for review, wherein the representation of the pair of documents identifies the first salient text feature and the second salient text feature in a manner that highlights a match between the first salient text feature and the second salient text feature; receiving data indicative of feedback about the pair of documents, the feedback comprising a confirmation of the including of the first document and the second document together in the common event document list; and adjusting the threshold condition based on the feedback.

2. The computer-implemented method of claim 1, wherein the event attribute comprises an event time.

3. The computer-implemented method of claim 1, wherein the event attribute comprises an event location.

4. The computer-implemented method of claim 1, wherein the event attribute comprises an entity type of an entity associated with the event.

5. The computer-implemented method of claim 1, wherein identifying the document subset comprises excluding a third document from inclusion in the document subset based on respective metadata for the third document.

6. The computer-implemented method of claim 1, wherein the first salient text feature comprise a first multi-word term, and wherein the second salient text feature comprise a second multi-word term, and wherein the event similarity score is determined based on the first multi-word term and the second multi-word term.

7. The computer-implemented method of claim 6, wherein extracting the first salient text feature comprises extracting the first salient text feature using natural language processing.

8. The computer-implemented method of claim 7, wherein extracting the first salient text feature using natural language processing comprises identifying the first salient text feature as an n-gram.

9. The computer-implemented method of claim 6, wherein determining the event similarity score comprises:
computing a first weight corresponding to the first multi-word term using a rarity measure;
computing a second weight corresponding to the second multi-word term using a rarity measure; and
determining the event similarity score based on the first weight, the first multi-word term, the second weight, and the second multi-word term.

10. The computer-implemented method of claim 9, wherein the rarity measure comprises an inverse document frequency.

11. The computer-implemented method of claim 6, wherein extracting the first multi-word term comprises expanding an acronym using an acronym list.

12. The computer-implemented method of claim 6, wherein the first salient text feature comprises a first aircraft event, and wherein the second salient text feature comprises a second aircraft event.

13. The computer-implemented method of claim 1, wherein extracting the first salient text feature comprises extracting a first alphanumerical expression or a first multiword term, wherein extracting the second salient text feature comprises extracting a second alphanumerical expression or a second multiword term.

14. The computer-implemented method of claim 1, wherein extracting the first salient text feature comprises extracting a first numerical expression using a regular expression, wherein extracting the second salient text feature comprises extracting a second numerical expression using a regular expression, and wherein the event similarity score is determined based on the first numerical expression and the second numerical expression.

15. The computer-implemented method of claim 1, wherein extracting the first salient text feature comprises extracting a first alphanumerical expression using a regular expression, wherein extracting the second salient text feature comprises extracting a second alphanumerical expression using a regular expression, and wherein the event similarity score is determined based on the first alphanumerical expression and the second alphanumerical expression.

16. The computer-implemented method of claim 15, wherein the regular expression comprises a number and unit pattern.

17. The computer-implemented method of claim 1, further comprising extracting a third salient text feature from the first document and a fourth salient text feature from the second document,
wherein the event similarity score is further based on a comparison between the third salient text feature and the fourth salient text feature.

18. The computer-implemented method of claim 1, wherein the respective metadata for the documents of the plurality of documents comprises a structured content field storing information that enables grouping of the documents of the plurality of documents, and wherein identifying the document subset comprises grouping the multiple documents into the document subset based on the information of the structured content field for the multiple documents.

19. The computer-implemented method of claim 16, further comprising:
extracting a third salient text feature from the first document; and
determining that the third salient text feature does not match any salient text features extracted from the second document,
wherein the representation identifies the third salient text feature as unmatched.

20. A system for event matching, the system comprising: at least one processor; and a memory storing instructions that, when executed by the at least one processor, cause the at least one processor to perform functions comprising: acquiring a plurality of documents, wherein each document of the plurality of documents comprises respective metadata that is indicative of an event attribute, identifying a document subset comprising multiple documents of the plurality of documents using the respective metadata for each document of the multiple documents, extracting a first salient text feature from a first document of the multiple documents and a second salient text feature from a second document of the multiple documents, determining, based on a comparison between the first salient text feature and the second salient text feature, an event similarity score for the first document and the second document; and upon determining that the event similarity score satisfies a threshold condition, including the first document and the second document as a pair of documents in a common event document list, wherein the common event document list identifies pairs of documents whose respective event similarity scores satisfy the threshold condition, providing, for display, a representation of the pair of documents for review, wherein the representation of the pair of documents identifies the first salient text feature and the second salient text feature in a manner that highlights a match between the first salient text feature and the second salient text feature, receiving data indicative of feedback about the pair of documents, the feedback comprising a confirmation of the including of the first document and the second document together in the common event document list, and adjusting the threshold condition based on the feedback.

21. A non-transitory computer-readable medium having stored therein instructions that, when executed by at least one processor, cause the at least one processor to perform functions comprising: acquiring a plurality of documents, wherein each document of the plurality of documents comprises respective metadata that is indicative of an event attribute, identifying a document subset comprising multiple documents of the plurality of documents using the respective metadata for each document of the multiple documents, extracting a first salient text feature from a first document of the multiple documents and a second salient text feature from a second document of the multiple documents, determining, based on a comparison between the first salient text feature and the second salient text feature, an event similarity score for the first document and the second document; and upon determining that the event similarity score satisfies a threshold condition, including the first document and the second document as a pair of documents in a common event document list, wherein the common event document list identifies pairs of documents whose respective event similarity scores satisfy the threshold condition, providing, for display, a representation of the pair of documents for review, wherein the representation of the pair of documents identifies the first salient text feature and the second salient text feature in a manner that highlights a match between the first salient text feature and the second salient text feature, receiving data indicative of feedback about the pair of documents, the feedback comprising a confirmation of the including of the first document and the second document together in the common event document list, and adjusting the threshold condition based on the feedback.

* * * * *